United States Patent
Noll

(10) Patent No.: US 10,753,051 B2
(45) Date of Patent: Aug. 25, 2020

(54) METHOD FOR THE FORESIGHTED CONTROL OF A ROAD FINISHER

(71) Applicant: JOSEPH VOEGELE AG, Ludwigshafen/Rhein (DE)

(72) Inventor: Tobias Noll, Roschbach (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 0 days.

(21) Appl. No.: 16/410,541

(22) Filed: May 13, 2019

(65) Prior Publication Data
US 2019/0352863 A1    Nov. 21, 2019

(30) Foreign Application Priority Data
May 15, 2018 (EP) .................................. 18172399

(51) Int. Cl.
*E01C 19/48* (2006.01)
*E01C 19/42* (2006.01)

(52) U.S. Cl.
CPC .............. *E01C 19/48* (2013.01); *E01C 19/42* (2013.01); *E01C 2301/10* (2013.01); *E01C 2301/16* (2013.01)

(58) Field of Classification Search
CPC ...... E01C 19/42; E01C 19/48; E01C 2301/10; E01C 2301/16
USPC ............... 404/72, 75, 77, 79, 84.05, 95, 118
See application file for complete search history.

(56) References Cited

U.S. PATENT DOCUMENTS

| | | |
|---|---|---|
| 8,356,958 B2 | 1/2013 | Braun et al. |
| 8,517,628 B2 | 8/2013 | Weiser et al. |
| 2015/0361626 A1 | 12/2015 | Trox et al. |

FOREIGN PATENT DOCUMENTS

| | | |
|---|---|---|
| EP | 2 256 248 A1 | 12/2010 |
| EP | 2 281 947 A1 | 2/2011 |
| WO | 2011/014473 A1 | 2/2011 |
| WO | 2013/034729 A1 | 3/2013 |
| WO | 2014/124545 A1 | 8/2014 |

OTHER PUBLICATIONS

European Search Report dated Nov. 30, 2018, Application No. 18172399.0-1002, Applicant Joseph Voegele AG, 11 Pages.
Indian Examination Report dated May 19, 2020, Application No. 201914018987, 6 Pages.

*Primary Examiner* — Raymond W Addie
(74) *Attorney, Agent, or Firm* — Brooks Kushman P.C.

(57) ABSTRACT

A road finisher having a primary drive unit, a material hopper and a paving screed with a screed heating system that can be operated by energy generated by the primary drive unit is controlled. The screed heating system is operated to heat the screed during paving operation of the road finisher by controlling a temperature of the screed to a predetermined screed operating temperature value or to a predetermined screed operating temperature range. The road finisher anticipates a future operating state of increased energy demand of the road finisher. When a future operating state of increased energy demand has been detected, the screed heating system is operated to heat the screed beyond the predetermined screed operating temperature value or the predetermined screed operating temperature range. When the operating state of increased energy demand is reached, the screed heating system is at least temporarily deactivated.

18 Claims, 1 Drawing Sheet

METHOD FOR THE FORESIGHTED CONTROL OF A ROAD FINISHER

CROSS-REFERENCE TO RELATED APPLICATIONS

This application claims foreign priority benefits under 35 U.S.C. § 119(a)-(d) to European patent application number EP 18172399.0, filed May 15, 2018, which is incorporated by reference in its entirety.

TECHNICAL FIELD

The disclosure refers to a method for controlling a road finisher.

BACKGROUND

Road finishers are construction vehicles for paving a pavement on a plane. Road finishers usually comprise a hopper located at the front in the direction of travel of the road finisher for receiving the paving material. The paving material is transported from the road finisher's hopper to the rear of the road finisher in the direction opposite to the direction of travel by means of transport such as scraper conveyors. There, the paving material is distributed transversely to the road finisher's direction of travel by means of a cross-distributing device, such as a spreading auger, and fed to a paving screed pulled by the road finisher behind the cross-distributing device. The paving screed is used for smoothing and compacting the applied paving material and may have, for example, tamping equipment, vibrating smoothing plates and/or pressure bars.

Road finishers are usually driven by a combustion engine, in particular a diesel engine. In addition to the drive power for the road finisher's driving function, the combustion engine also provides power for working units and other components of the road finisher. For example, the combustion engine can drive a generator that generates electricity to operate a large number of components of the road finisher. In particular, the power generated by the generator can be used to operate an electric screed heating system, which heats the screed to prevent the hot material from cooling and solidifying on the screed. The road finisher's hydraulic systems can also be supplied with energy directly from the combustion engine or via the generator. To cool the combustion engine during operation, a cooling system is provided in which an especially liquid cooling medium absorbs waste heat from the combustion engine. The cooling medium is cooled by a cooling air flow generated by a fan.

EP 2 281 947 A1 describes a method for fuel-efficient operation of a road finisher. If the road finisher is waiting for a truck to arrive with the paving material before paving begins or during a break in paving, the diesel engine of the road finisher remains switched off in order not to consume any fuel. This also means that the screed heating system of the road finisher is inactive. The road finisher uses a positioning and navigation system to determine the position of the approaching truck and the expected arrival time of the paving material. The road finisher's control system stores information on how long it takes to heat the screed to operating temperature. This enables the control system to switch on the diesel engine at a suitable time so that the required operating temperature is reached exactly when the truck arrives. In this way, unnecessarily long heating phases are avoided, while the paving operation can still be started immediately after the paving material has arrived. Although avoiding unnecessary heating times can reduce the road finisher's fuel consumption, there is still room for further improvements in the road finisher's energy efficiency.

SUMMARY

It is an object of the disclosure to provide a method for controlling a road finisher with improved energy efficiency.

The disclosure provides two alternative solutions to the above-mentioned problem, both based on a common inventive principle based on a foresighted control of energy-consuming components of the road finisher.

According to a first variant of the disclosure, a method for controlling a road finisher is provided, which comprises a primary drive unit, a material hopper at the front in the direction of travel of the road finisher for receiving the paving material and a paving screed at the rear in the direction of travel for compacting the paving material. The primary drive unit can, for example, be a combustion engine, especially a diesel engine. The paving screed comprises a screed heating system that can be operated with energy generated by the primary drive unit. The screed heating system is preferably an electric screed heating system with electric resistance heating elements, which is supplied with energy by the primary drive unit via a generator.

During (normal) paving operation, the screed heating system for heating the screed is operated by controlling a temperature of the screed to a predetermined screed operating temperature value or to a predetermined screed operating temperature range. In particular, the screed operating temperature value or the screed operating temperature range may at least substantially correspond to or include a temperature of the hot paving material.

In accordance with the disclosure, a future operating state of increased energy demand of the road finisher is anticipated by the road finisher. The road finisher can detect the future operating state of increased energy demand, for example, based on the detection or receipt of data, by calculation and/or based on a user input.

When a future operating state of increased energy demand is detected, the screed heating system is operated to heat the screed above the predetermined screed operating temperature value or the predetermined screed operating temperature range. In this case, the screed is heated to a temperature that is actually too high. In particular, this can be done automatically. When the operating state of increased energy demand is reached, the screed heating system is deactivated at least temporarily. The screed heating system can also be deactivated automatically. As the screed has already been heated above the screed operating temperature value or operating temperature range used in normal paving operations, deactivating the screed heating system does not immediately lead to a critical reduction in the temperature of the screed when the operating state of increased energy demand occurs. Although the screed cools down, it is still warm enough for a certain period of time due to overheating that the paving material does not solidify on the screed and stick to it.

Deactivating the screed heating system when the screed is in an operating state of increased energy demand relieves the load on the primary drive unit. In this way, peak loads can be absorbed. This makes it possible to use a smaller primary drive unit. In addition, the primary drive unit can run in its optimum operating range over longer periods of time, making it particularly energy-efficient. The method described here enables the road finisher to be controlled with foresight by putting additional energy into the road finisher screed's overheating process even before the operating state of increased energy demand for the screed has been reached, so that the screed heating system can be switched off when the operating state of increased energy demand is reached.

Preferably, the foresighted detection of the future operating state of increased energy demand includes the detection of an expected time of occurrence of the operating state of increased energy demand. If the expected time of occurrence of the operating state of the increased energy demand is known, the foresighted control system of the road finisher can be particularly well adapted to the respective operating situation.

Operating the screed heating system to heat the paving screed above the specified screed operating temperature or the specified screed operating temperature range can start before the anticipated time of occurrence of the increased energy demand.

A start time of heating the screed beyond the predetermined screed operating temperature value or the predetermined screed operating temperature range can be determined based on the estimated time of occurrence of the operating state of increased energy demand. This ensures that the screed is sufficiently heated when the increased energy demand occurs, but that heating beyond the predetermined screed operating temperature value or the predetermined screed operating temperature range is not unnecessarily early.

After the screed heating system has been deactivated when the operating state of increased energy demand occurs, the screed heating system can again be released for activation when the operating state of increased energy demand is over. By preventing activation of the screed heating system during the operation state of increased energy demand, it can be ensured that power peaks of the primary drive unit are avoided. Once the operating state of increased energy demand has been completed, the screed heating system can be controlled normally for normal paving operation.

It is preferable to reactivate the screed heating system after the screed has been deactivated after the increased energy demand has occurred when the screed operating temperature falls below the pre-set operating temperature value or the pre-set operating temperature range. This ensures in any case that the screed does not cool down too much. According to an embodiment, the screed heating system can be reactivated when the screed's operating temperature falls below the predetermined operating temperature value or the predetermined screed operating temperature range, even if the operating state of increased energy demand continues. This may be particularly relevant in the case of prolonged operating states of increased energy demand.

It would also be conceivable for the screed heating system to be reactivated after a predetermined period of time has elapsed since the screed heating system was deactivated when the operating state of increased energy demand occurred.

According to a second variant of the disclosure, a method is provided for controlling a road finisher with a primary drive unit, a material hopper at the front in the paving direction for receiving paving material, a paving screed at the rear in the paving direction for compacting the paving material and a cooling system. The primary drive unit can, for example, be a combustion engine, especially a diesel engine. The cooling system comprises a cooling medium as well as a fan which can be operated by the energy generated by the primary drive unit to generate a cooling air flow for cooling the cooling medium. The cooling medium can, for example, comprise a cooling liquid or a cooling element. In particular, the cooling medium may be in heat exchange with the primary drive unit and/or other components of the road finisher, such as hydraulic systems, to cool the primary drive unit and/or the other components.

During (normal) paving operation of the road finisher, the fan is operated so that a temperature of the cooling medium is controlled to a predetermined cooling medium operating temperature value or to a predetermined cooling medium operating temperature range. The predetermined cooling medium operating temperature value or the predetermined cooling medium operating temperature range can be selected so that components of the road finisher cooled by the cooling system are sufficiently cooled.

The method according to the second variant of the disclosure described here also includes a foresighted recognition of a future operating state of increased energy demand of the road finisher. The road finisher can detect the future operating state of increased energy demand, for example, based on the detection or retrieval of data, calculation and/or user input.

When a future operating state of increased energy demand has been detected, the fan is operated to cool the cooling medium below the predetermined cooling medium operating temperature value or the predetermined cooling medium operating temperature range. This means that the cooling medium is cooled more than in normal operation. In particular, this can be done automatically. If the operating state of increased energy demand occurs, the fan is then deactivated at least temporarily. The fan can also be deactivated automatically. Since the cooling medium was cooled more strongly than during normal operation before the fan was deactivated, heating of the cooling medium after the fan is deactivated does not immediately lead to overheating of the components to be cooled.

The deactivation of the fan when the operating state of increased energy demand occurs made possible by the foresighted overcooling of the cooling medium, relieves the primary drive unit in the operating state of increased energy demand and can thus absorb power peaks. Thus, the method according to the disclosure can even allow the use of a smaller primary drive unit. By absorbing the power peaks, the primary drive unit can also run longer in an optimum operating range, which increases energy efficiency.

The foresighted detection of the future operating state of increased energy demand preferably includes the detection of an expected time of occurrence of the operating state of increased energy demand.

Operating the fan to cool the cooling medium below the predetermined cooling medium operating temperature value or the predetermined cooling medium operating temperature range may start before the expected time of occurrence of the operating state of increased energy demand.

A start time of operating the fan to cool the cooling medium below the predetermined cooling medium operating temperature value or the predetermined cooling medium operating temperature range can be determined based on the expected time of occurrence of the operating state of increased energy demand.

The fan can be enabled again for activation after being deactivated when the operating state of increased energy demand occurs, when the operating state of increased energy demand is over.

After deactivation, the fan can be reactivated if the predetermined cooling medium operating temperature value or the predetermined cooling medium operating temperature range is exceeded. In particular, if the predetermined cooling medium operating temperature value or the predetermined cooling medium operating temperature range is exceeded, the fan can be reactivated even if the operating state of increased energy demand continues.

It is also conceivable to reactivate the fan after a predetermined period of time has elapsed since the fan was deactivated when the operating state of increased energy demand occurred.

Both variants of the disclosure described are based on the principle to foresightedly overheat or undercool a component to be heated (paving screed) or a component to be cooled (cooling medium) of the road finisher. By utilising the heat capacity of the screed or the cooling medium, a deactivation of the screed heating system or the fan can be enabled when the operating state of increased energy demand is reached to increase the energy efficiency of the road finisher.

According to both variants, the future operating state of increased energy demand can include, for example, the start of a paving operation or an uphill driving of the road finisher. At the start of a paving operation, the road finisher's energy need is increased due to a number of aspects. It is particularly relevant here that at the start of the paving process, the paving material has to be conveyed from the material hopper to the rear of the road finisher and the material flow of the paving material has to be set in motion. In addition, the road finisher must be accelerated at the start of the paving operation. When the road finisher is driven uphill, the increased energy need results from the increased energy need of the travel drive of the road finisher.

The foresighted recognition of the future operating state of increased energy demand can include the recognition or reception of an estimated time of arrival of a truck for supplying the road finisher with paving material. The arrival of such a truck may be an indication, particularly at the time as the road finisher waits for paving material for the start or continuation of a paving process, when the increased energy demand existing at the beginning of a paving process is to be expected.

The foresighted recognition of the future operating state of increased energy demand could alternatively or additionally also include the receipt or evaluation of planning or route data. For example, it could be predicted that the road finisher will drive uphill.

The two methods described above as separate methods for controlling a road finisher (foresighted control of the screed heating system and foresighted control of the cooling system) could also be combined and carried out together. In this way, the energy efficiency of the road finisher could be further increased.

In the following, embodiments according to the disclosure will be explained in more detail with reference to the attached Figures.

DETAILED DESCRIPTION

Figure 1:
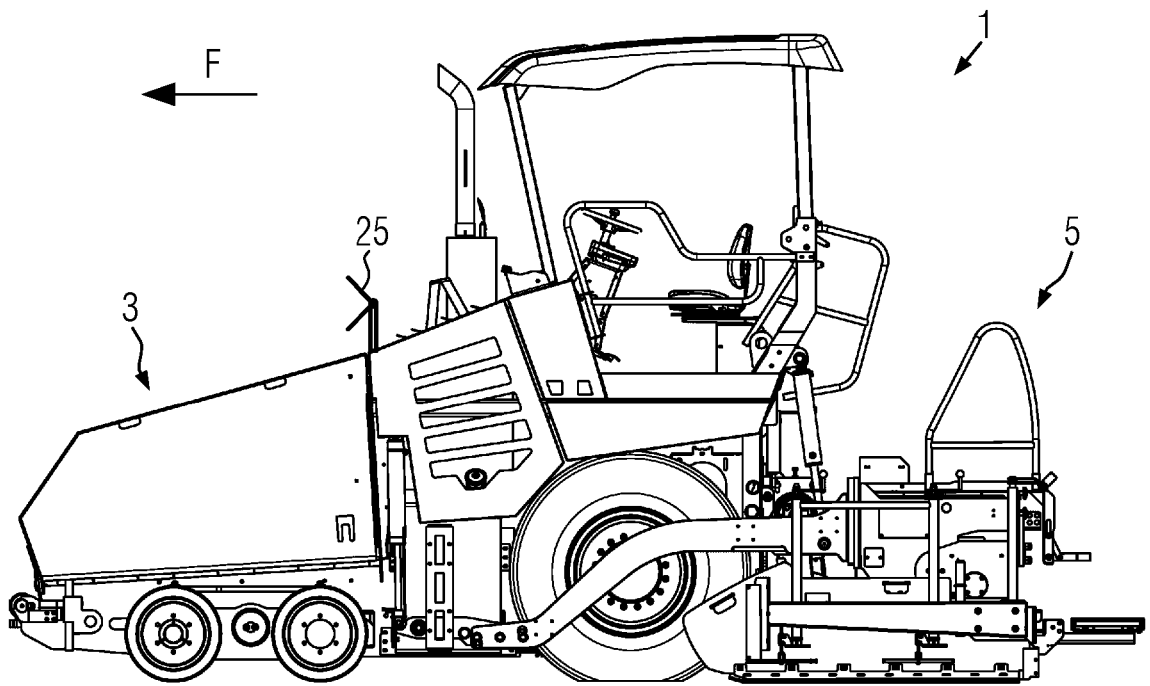
FIG. 1 shows a schematic representation of a road finisher according to an embodiment in which the two disclosure variants described above are realised simultaneously.

FIG. 1 shows a road finisher 1, which is controlled by a method according to an embodiment. The road finisher 1 comprises a hopper 3 at the front in paving direction F for receiving paving material. The road finisher 1 also includes a paving screed 5 located at the rear in paving direction F for compacting and smoothing the paving material. During paving operation, paving material is conveyed from the hopper 3 to the rear in the opposite direction to the paving direction F and placed before the paving screed 5. The road finisher 1 comprises a primary drive unit M (see FIG. 2), in this case a combustion engine designed in particular as a diesel engine. The primary drive unit M provides energy for the travel drive, for drives for working components of the road finisher 1 and for other energy consumers of the road finisher 1.

The paving screed 5 is equipped with a screed heating system 7, which in the embodiment shown comprises two electric resistance heating elements 9 for heating the paving screed 5. The screed heating system 7 is supplied with energy by the primary drive unit M. For this purpose, a generator G is operated by the primary drive unit M and generates electrical power to supply the screed heating system 7. It is conceivable that other electrical consumers of the road finisher 1 will also be supplied with electrical power via generator G.

During normal paving operation of the road finisher 1, the screed heating system 7 is operated according to a control scheme to ensure that the screed 5 is always at a sufficient temperature to prevent the paving material from cooling down on the screed 5, which could lead to the paving material sticking to the screed 5. A controller 11 of road finisher 1 receives an output signal from a temperature sensor 13 provided on paving screed 5 and, based on the output signal received, controls the screed heating system 7 during normal paving operation of road finisher 1. The temperature of screed 5 can be controlled to a predetermined operating temperature value by controlling screed heating system 7. For this purpose, the controller 11 can activate or deactivate the screed heating system 7 in a control loop depending on the output signal received from the temperature sensor 13. In order to prevent screed heating system 7 from being switched on and off frequently, it may be advisable to control the temperature of screed 5 not to a screed operating temperature value but to a predetermined screed operating temperature range which permits a certain temperature range. For example, controller 11 can activate screed heating system 7 if the output signal from temperature sensor 13 indicates that a lower temperature threshold value is undershot (e.g., fallen below), and deactivate screed heating system 7 if the output signal from temperature sensor 13 indicates that an upper temperature threshold value is overshot (e.g., exceeded).

Figure 2:
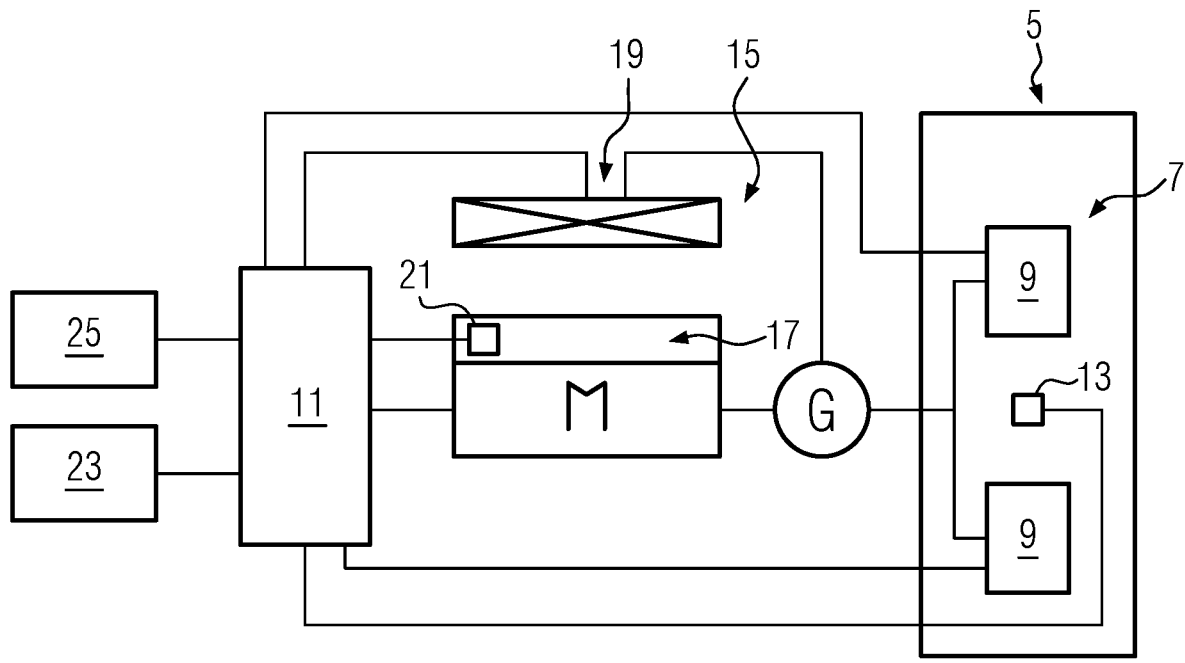
FIG. 2 shows a block diagram illustrating the interaction of different components of the road finisher.

The road finisher 1 also includes a cooling system 15, which can be designed to cool various components of the road finisher 1. FIG. 2 shows the cooling system 15 as a cooling system for cooling the primary drive unit M. It would also be conceivable, however, that the cooling system 15 could additionally or alternatively cool other components of the road finisher 1, such as a hydraulic system. The cooling system 15 comprises a cooling medium 17 which is in heat exchange with the component to be cooled of road finisher 1. In the case of cooling of the primary drive unit M, the cooling medium 17 comprises a coolant from an engine cooling system. In other applications, however, the cooling medium 17 can also be designed as a cooling element, for example. The cooling system 15 also includes a fan 19 for generating a cooling air flow to cool the cooling medium 17. The fan 19 is operated with electrical energy via generator G, i.e., it is ultimately also supplied with energy by the primary drive unit M, which drives generator G.

During normal paving operation of road finisher 1, the temperature of the cooling medium 17 is controlled by regulating fan 19 using controller 11 of road finisher 1. The controller 11 can either activate or deactivate the fan 19 for this purpose, or it can also adapt a fan speed of the fan 19 suitably. The controller 11 receives an output signal from a temperature sensor 21, which determines the temperature of the cooling medium 17. Based on this output signal, the controller 11 can regulate the fan 19 so that the temperature of the cooling medium 17 is regulated to a predetermined cooling medium operating temperature value. To achieve a smoother control response, the temperature of the cooling medium 17 can also be controlled to a predetermined cooling medium operating temperature range with a certain width.

In accordance with the disclosure, a future operating state of increased energy demand of the road finisher 1 is recognised foresightedly and taken into account in the control of the road finisher 1. Such an operating state of increased energy demand is an operating state in which at least one component of the road finisher 1 supplied by the primary drive unit M has an increased energy demand and/or must be additionally activated. An example of an operating state of increased energy demand is an uphill drive of road finisher 1 where the travel drive of road finisher 1 has an increased energy demand. Also, at the start of a paving operation, there is an increased energy demand. At the start of the paving process, for example, more energy must be used to accelerate the road finisher 1 and to start the material flow from the material hopper 3 to the rear of the road finisher 1.

A future operating state of increased energy demand can be predicted in different ways. For example, the controller 11 of road finisher 1 can use planning data or route data from the respective construction project to predict future uphill driving of road finisher 1 or other relevant operating situations. The planning or route data could, for example, be stored in road finisher 1 itself or fed to the road finisher 1 via a communication module 23.

In order to be able to foresightedly detect the start of a paving operation (on a new construction site or after a paving interruption), it is possible, for example, to identify the estimated arrival time of a truck to load road finisher 1 with paving material. The arrival time of the truck could be transmitted to control unit 11 by a higher-level construction site organisation system via communication module 23. It would also be conceivable, however, that the road finisher 1 would include a truck detection device 25, which would optically detect the approach of the truck. It is also possible to determine the estimated time of arrival of the truck by means of communication between the truck and the road finisher 1.

Other variants are also conceivable as to how a future operating state of increased energy demand of the road finisher 1 can be foresightedly detected. Preferably, an expected time of occurrence of the operating state of increased energy demand is also detected, in particular estimated.

If a future operating state of increased energy demand is detected, measures are taken to be able to absorb the expected peak power. In the embodiment described below, these measures include both adjusting the operation of the screed heating system 7 and adjusting the operation of the cooling system 15. However, it would also be conceivable to only adjust operation of the screed heating system 7 or alternatively the cooling system 15.

If a future operating state of increased energy demand is detected, the screed heating system 7 is controlled by the control system 11 to heat the screed 5 above the predetermined operating temperature value or operating temperature range relevant for control in normal paving operation before the predicted time of occurrence of the operating state of increased energy demand. This means that screed 5 is overheated to a certain extent before the increased energy demand occurs. It goes without saying that this overheating takes place in a frame that ensures that the screed 5 is not damaged by overheating.

In addition, if the future operating state of increased energy demand is detected, the operation of fan 19 of cooling system 15 is adapted. Before the expected time of occurrence of the operating state of increased energy demand, the controller 11 of road finisher 1 controls the fan 19 for increased cooling of the cooling medium 17 below the cooling medium operating temperature value or cooling medium operating temperature range relevant for control in normal paving operation of road finisher 1. The cooling medium 17 is thus subcooled before the operating state of increased energy demand occurs.

When a future operating state of increased energy demand of the road finisher 1 is detected, energy is put into the heating of the screed 5 and the cooling of the cooling medium 17. When the operating state occurs (actual entry or attainment of the predicted occurrence time), the screed heating system 7 and the fan 19 are deactivated. The load of the primary drive unit M is thus reduced and the peak power is absorbed when the operating state of increased energy demand is reached. This procedure uses the heat capacity of paving screed 5 and the heat capacity of the cooling medium 17 as a buffer to temporarily deactivate screed heating system 7 and fan 19.

It would be conceivable to release the screed heating system 7 and the fan 19 for activation again when the operating state of increased energy demand is over. If necessary, the screed heating system 7 and the fan 19 can also be reactivated earlier.

Preferably, the temperature of the screed 5 is monitored by the temperature sensor 13 even during the operating state of increased energy demand. To prevent the screed 5 from cooling down too much, the screed heating system 7 can be reactivated when the temperature sensor 13 signals that the screed's operating temperature has fallen below the pre-set operating temperature value or the pre-set operating temperature range.

Similarly, the temperature sensor 21 can continue to monitor the temperature of the cooling medium 17 during the operating state of increased energy demand. The fan 19 can be reactivated when the predetermined cooling medium operating temperature value or range is exceeded to prevent the cooling medium 17 from overheating.

As one skilled in the art would understand, the controller 11 may include suitable hardware and software, such as one or more processors (e.g., one or more microprocessors, microcontrollers and/or programmable digital signal processors) in communication with, or configured to communicate with, one or more storage devices or media including computer readable program instructions that are executable by the one or more processors so that the controller 11 may perform particular algorithms represented by the functions and/or operations described herein. The controller 11 may also, or instead, include one or more application specific integrated circuits, programmable gate arrays or programmable array logic, programmable logic devices, or digital signal processors.

What is claimed is:

1. A method for controlling a road finisher having a primary drive unit, a material hopper located at a front of the road finisher in a paving direction, and a paving screed located at a rear of the road finisher in the paving direction and having a screed heating system which can be operated by energy generated by the primary drive unit, the method comprising:
   operating the screed heating system to heat the paving screed during a paving operation of the road finisher by controlling a temperature of the paving screed to a predetermined screed operating temperature value or to a predetermined screed operating temperature range;
   in response to foresighted recognition by the road finisher of a future operating state of increased energy demand of the road finisher, operating the screed heating system to heat the paving screed beyond the predetermined screed operating temperature value or the predetermined screed operating temperature range; and
   at least temporarily deactivating the screed heating system in response to the operating state of increased energy demand being reached.

2. The method according to claim 1, wherein the screed heating system is released for activation again after deactivation when the operating state of increased energy demand is over.

3. The method according to claim 1 further comprising reactivating the screed heating system after deactivation if the predetermined screed operating temperature value or the predetermined screed operating temperature range is undershot.

4. The method according to claim 1, wherein the future operating state of increased energy demand comprises start of a paving operation or driving the road finisher uphill.

5. The method according to claim 1, wherein the foresighted detection of the future operating state of increased energy demand comprises detecting or receiving an estimated time of arrival of a truck for supplying the road finisher with paving material.

6. The method according to claim 1, wherein the foresighted recognition of the future operating state of increased energy demand comprises obtaining or evaluating planning or route data.

7. The method according to claim 1, wherein the foresighted recognition of the future operating state of increased energy demand comprises the recognition of an expected time of occurrence of the operating state of increased energy demand.

8. The method according to claim 7, wherein operating the screed heating system to heat the screed beyond the predetermined screed operating temperature value or the predetermined screed operating temperature range starts before the expected time of occurrence of the operating state of increased energy demand.

9. The method according to claim 7, wherein a start time of operating the screed heating system for heating the screed beyond the predetermined screed operating temperature value or the predetermined screed operating temperature range is determined based on the estimated time of occurrence of the operating state of increased energy demand.

10. A method for controlling a road finisher having a primary drive unit, a material hopper located at a front of the road finisher in the paving direction, a paving screed located at a rear of the road finisher in the paving direction, and a cooling system having a cooling medium and a fan, which can be operated by energy generated by the primary drive unit to generate a cooling air flow to cool the cooling medium, the method comprising:
   operating the fan during paving operation of the road finisher to control a temperature of the cooling medium to a predetermined cooling medium operating temperature value or to a predetermined cooling medium operating temperature range;
   in response to foresighted recognition by the road finisher of a future operating state of increased energy demand of the road finisher, operating the fan to cool the cooling medium below the predetermined cooling medium operating temperature value or the predetermined cooling medium operating temperature range; and
   at least temporarily deactivating the fan in response to occurrence of the operating state of increased energy demand.

11. The method according to claim 10, wherein the fan is released for reactivation after deactivation when the operating state of increased energy demand is over.

12. The method according to claim 10 further comprising reactivating the fan after deactivation when the predetermined cooling medium operating temperature value or the predetermined cooling medium operating temperature range is exceeded.

13. The method according to claim 10, wherein the future operating state of increased energy demand comprises start of a paving operation or driving the road finisher uphill.

14. The method according to claim 10, wherein the foresighted detection of the future operating state of increased energy demand comprises detecting or receiving an estimated time of arrival of a truck for supplying the road finisher with paving material.

15. The method according to claim 10, wherein the foresighted recognition of the future operating state of increased energy demand comprises obtaining or evaluating planning or route data.

16. The method according to claim 10, wherein the foresighted recognition of the future operating state of increased energy demand comprises the recognition of an expected time of occurrence of the operating state of increased energy demand.

17. The method according to claim 16, wherein operating the fan to cool the cooling medium below the predetermined cooling medium operating temperature value or the predetermined cooling medium operating temperature range starts prior to the expected time of occurrence of the operating state of increased energy demand.

18. The method according to claim 16, wherein a start time of operating the fan to cool the cooling medium below the predetermined cooling medium operating temperature value or the predetermined cooling medium operating temperature range is determined based on the expected time of occurrence of the operating state of increased energy demand.

* * * * *